United States Patent
Trottier-Lapointe

(10) Patent No.: US 12,174,466 B2
(45) Date of Patent: Dec. 24, 2024

(54) OPHTHALMIC LENS HAVING ANTI-REFLECTIVE AND ELECTROCHROMIC FUNCTIONS

(71) Applicant: ESSILOR INTERNATIONAL, Charenton-le-Pont (FR)

(72) Inventor: William Trottier-Lapointe, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 949 days.

(21) Appl. No.: 17/263,426

(22) PCT Filed: Jul. 26, 2019

(86) PCT No.: PCT/EP2019/070269
§ 371 (c)(1),
(2) Date: Jan. 26, 2021

(87) PCT Pub. No.: WO2020/021107
PCT Pub. Date: Jan. 30, 2020

(65) Prior Publication Data
US 2021/0294126 A1  Sep. 23, 2021

(30) Foreign Application Priority Data
Jul. 27, 2018 (EP) .................... 18306022

(51) Int. Cl.
*G02C 7/10* (2006.01)
*G02F 1/155* (2006.01)
*G02F 1/157* (2006.01)

(52) U.S. Cl.
CPC ............ *G02C 7/101* (2013.01); *G02C 7/104* (2013.01); *G02C 7/107* (2013.01); *G02F 1/155* (2013.01); *G02F 1/157* (2013.01)

(58) Field of Classification Search
CPC ........ G02C 7/101; G02C 7/104; G02C 7/107; G02F 1/155; G02F 1/157
USPC ....................................... 351/159.39
See application file for complete search history.

(56) References Cited

U.S. PATENT DOCUMENTS

| 4,211,823 A | 7/1980 | Suzuki et al. |
| 5,015,523 A | 5/1991 | Kawashima et al. |
| 2013/0094073 A1* | 4/2013 | Ushigome ............ G02F 1/157 359/275 |
| 2014/0327950 A1 | 11/2014 | Trajkovska-Broach et al. |
| 2016/0026056 A1 | 1/2016 | Koo et al. |

FOREIGN PATENT DOCUMENTS

| EP | 0 614 957 | 9/1994 |
| FR | 2 702 486 | 9/1994 |
| JP | H08-114822 A | 5/1996 |
| JP | 2005-077825 | 3/2005 |
| WO | 2011/080472 | 7/2011 |
| WO | WO-2017021668 A1 * | 2/2017 ............. B29C 67/00 |

OTHER PUBLICATIONS

Translation (Year: 2017).*
International Search Report for PCT/EP2019/070269 dated Oct. 2, 2019, 3 pages.
Written Opinion of the ISA for PCT/EP2019/070269 dated Oct. 2, 2019, 8 pages.
Office Action issued in Japanese Patent Application No. 2021-504334 dated Feb. 13, 2023.

* cited by examiner

Primary Examiner — James R Greece
(74) Attorney, Agent, or Firm — NIXON & VANDERHYE

(57) ABSTRACT

Disclosed is an ophthalmic lens including a transparent substrate with a front main face and a rear main face, at least one of the main faces being coated with a multilayered interferential stack (IF stack), including at least one HI layer having a refractive index higher than or equal 1.55 and at least one LI layer having a refractive index lower than 1.55, characterized in that an electrochromic stack (EC stack): is part of the multilayered interferential stack; or is directly deposited onto the multilayered interferential stack, so as to form a multilayered interferential coating (IF coating).

22 Claims, No Drawings

OPHTHALMIC LENS HAVING ANTI-REFLECTIVE AND ELECTROCHROMIC FUNCTIONS

CROSS-REFERENCE TO RELATED APPLICATIONS

This application is the U.S. national phase of International Application No. PCT/EP2019/070269 filed Jul. 26, 2019 which designated the U.S. and claims priority to EP 18306022.7 filed Jul. 27, 2018, the entire contents of each of which are hereby incorporated by reference.

BACKGROUND OF THE INVENTION

1. Field of the Invention

The invention relates to an optical article and especially to an ophthalmic lens comprising a transparent substrate coated with a multi-layer transparent interferential coating, preferably an anti-reflection (AR) coating having an electrochromic stack (EC), and in particular an ophthalmic lens.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are designated in general as functional coatings.

Thus, it is usual practice to coat at least one main surface of a lens substrate, typically made of an organic glass material, with successively, starting from the surface of the lens substrate, an impact-resistant coating (impact-resistant primer), an abrasion- and/or scratch-resistant coating (hard coat), an anti-reflection coating or a mirror coating and, optionally, an anti-fouling top coat.

An antireflective coating usually consists of a multilayer coating comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

Hence, traditional antireflective coatings are designed and optimized to reduce reflection on the lens surface in the visible region, typically within the spectrum range of 380 to 780 nm. They are also designed, especially in the case of an ophthalmic lens, to prevent the formation of annoying reflections to the wearer and his interlocutors. A reflective coating achieves the opposite effect, that is, it increases the reflection of light rays. Such a type of coating is used, for example, to obtain a mirror effect in solar lenses.

In general, the mean light reflection factor in the visible region $R_v$ on the front and/or rear faces of an ophtalmic lens is lower than or equal to 2.5%.

The traditional antireflective coatings may be designed to provide a high reflection in the ultraviolet band (from 280 to 380 nm) when they are positioned on the front side of the lens, but may be designed to be antireflective in those wavelengths when they are positioned on the backside (rear face) of the lens in order to protect against UV reflection from the back side of the lens.

In recent years, due to the increasing "health" requirement, near infrared (NIR) (780-1400 nm) and/or blue light protection (420-450 nm) are additionally required for anti-reflective coatings, especially in the ophthalmic lens applications.

Indeed, many studies suggest that high energy blue light has photo-toxic effects on the eye, and especially on the retina. Over exposure to blue light, particularly the photo-toxic blue light with wavelength shorter than 450 nm, can cause disruption. Phototoxic blue light is considered as an important factor for age-related macular degradation (AMD). Prolonged exposure to phototoxic blue light may cause retinal damage. Extensive use (>3-4 hours per day) of blue-light emitting digital devices (computers, smartphones, tablets, etc.) has been reported as one of the main reason for experiencing eye fatigue, blurred vision, dry eyes, and headaches.

Intensive NIR might be also harmful to retina. In addition, it has been reported that NIR could be one of the potential causes for dry eyes and cataracts.

Other coatings such as a polarized coating, a photochromic, an electrochromic or a dyeing coating may also be applied onto one or both surfaces of the lens substrate.

Especially, electrochromic coatings can be used in an optical article to provide certain benefits, including the blocking of certain wavelengths of visible or ultraviolet light.

While such benefits can be achieved to a degree using photochromic materials, photochromic materials have certain disadvantages with respect to electrochromic materials. For example, electrochromic materials can be activated and deactivated when desired, whereas photochromic materials simply respond to an external stimulus, such as the degree of ambient illumination.

Until now, electrochromic optical article, and especially electrochromic eyeglass lenses have suffered from certain limitations. These include: the inability to block light across the visible spectrum in a cosmetically pleasing manner or the inability to provide a range of contrast or blocking that is expected by consumers.

In addition, electrochromic eyeglasses have not yet gained wide acceptance on the market.

There is therefore a need to provide a novel optical article and especially an ophthalmic lens that can at least partially solve some of these problems.

There is also a need to provide a novel optical article and especially an ophthalmic lens that is able, not only to modulate the transmission, but also the reflection, while keeping electrochromic properties and having cosmetic effects (aesthetic appearance).

There is also a need to provide a novel optical article and especially an ophthalmic lens that is able to provide on demand a reflection in the near infrared region and/or a reflection in the harmful blue light region.

The ophthalmic lenses described herein are provided so as to address one or more of the above problems that have led to the slow development of commercially viable electrochromic ophthalmic lenses.

SUMMARY OF THE INVENTION

An aim of this invention is indeed to provide a transparent optical article and especially an ophthalmic lens comprising an organic or mineral glass substrate bearing an inorganic multilayered interferential coating, preferably an antireflective coating (named hereafter "AR coating"), preferably a lens, and more preferably an ophthalmic lens for eyeglasses, being able to modulate the reflection as necessary, i.e. to change the reflection from an antireflective state to a mirror state or to a first mirror state to a second mirror state when the multilayered interferential coating changes from the deactivated state to the activated state.

By "mirror state", it is meant that the multilayered interferential coating has a mean light reflection factor," noted $R_v$," that is higher than 2.5%, preferably higher than or equal to 10%, more preferably higher than or equal to 20% and by "antireflective state, it means that the multilayered antireflective coating has a mean light reflection factor that is lower than or equal to higher than 2.5% (for an angle of incidence lower than or equal to 17°, more preferably at an angle of incidence of 15°).

In the present application, the "mean light reflection factor," noted $R_v$, is such as defined in the ISO 13666:1998 Standard, and measured in accordance with the ISO 8980-4 Standard (for an angle of incidence lower than 17°, typically of 15°), i.e. this is the weighted spectral reflection average over the whole visible spectrum between 380 and 780 nm.

A second aim of this invention is to provide an optical article and especially an ophthalmic lens according to the invention bearing an AR coating that is able to modulate the reflection in the near infrared (NIR) region (780-1400 nm) and/or in the harmful blue light region (400-460 nm, preferably 415 to 455 nm, more preferably 420-450 nm).

Another aim of this invention is to provide an optical article and especially an ophthalmic lens according to the invention bearing an interferential coating, such as an AR coating, that is able to reduce the reflection on the rear face of said ophthalmic lens, called hereafter the "backside reflection" so as to protect the wearer's eye.

The inventors have found that these problems could be solved by providing a multilayered interferential coating forming from notably an electrochromic (EC) stack.

Indeed, an electrochromic stack, that is either part of a multilayered interferential coating or deposited directly onto a multilayered interferential stack so as to form a multilayered interferential coating, contributes to the interferential effect of the multilayer interferential coating thus formed, i.e. some of the layers of the electrochromic stacks contribute both to the electrochromic effect and to the interferential effect of the multilayer interferential coating. Upon activation of the EC stack, the refractive index and the extinction coefficient "k" of the electrochromic layer of said EC stack (such as a $WO_3$ layer) will change, which will also change the conditions of interference in the multilayered interferential coating and consequently its optical properties.

Thus, the present invention relates to an optical article and especially to an ophthalmic lens comprising a transparent substrate with a front main face and a rear main face, at least one of said main faces being coated with a multilayered interferential stack comprising at least one HI layer having a refractive index higher than or equal 1.55 and at least one LI layer having a refractive index lower than 1.55, characterized in that an electrochromic (EC) stack
  is part of said multilayered interferential stack, or
  is directly deposited onto said multilayered interferential stack,
  so as to form a multilayered interferential coating,
  said electrochromic stack being able to reversibly switch
    from an activated state when an electrical potential is applied to a deactivated state when the reverse electrical potential is applied.

In general, the total thickness of the multilayered interferential coating is equal to or below 1 μm.

In particular, the EC stack comprises an electrochromic layer, the refractive index of said electrochromic layer being different in the activated state and in the deactivated state.

Electrochromism is a well-known physical phenomenon which is observed with certain classes of chemical compounds that reversibly change colour when a voltage is applied to them. The electrochromic material undergoes reversible changes in optical properties by oxidation and reduction. Indeed, the optical properties of the electrochromic material are linked to its oxidation state and thus can be manipulated by the oxidation-reduction process through the loss or gain of electrons number. In general, the electrochromic material is colourless when an electric field is not applied and becomes coloured when an electric field is applied. The required electric field for an electrochromic colour change is generally very low. The colour remains even when the current has ceased to flow (the so-called "memory-effect") and the colour change is reversible when the inverted potential is applied.

Hence, due to its characteristics, the multilayered interferential coating, preferably an antireflective coating, according to the invention comprising the electrochromic stack enables to provide an ophthalmic lens whose optical properties and/or the reflected colour (cosmetic effect) may change between the activated state and the deactivated state and this according to the wearer's needs.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

1. Definition

As used herein, a material is "electrochromic" if it has the capability to maintain reversible and persistent change in optical properties when an electrical potential is applied to it (Chatten and al. 2005). It also displays a reversible change in colour which is reliant on the combined insertion and/or extraction of ions and electrons in a material in contact with an electrolyte or ion conductor (Hjelm and al. 1996).

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

Also unless otherwise indicated, the indication of an interval of values «from X to Y» or "between X to Y", according to the present invention, means as including the values of X and Y.

In the present application, when an optical article or an ophthalmic lens comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

By "a layer 1 under/below a layer 2", it is to be understood that layer 2 is further from the substrate than layer 1".

By "a layer 1 on/above a layer 2", it is to be understood that layer 2 is closer to the substrate than layer 1".

The terms multilayered interferential coating is named hereafter "IF coating". "IF coating" and "multilayered interferential stack" (hereafter "IF stack") have not the same meaning. Indeed, as used herein, the IF coating according to the invention is formed from the electrochromic stack (EC stack) and the IF stack, such as a multilayered antireflective (AR) stack (named hereafter "AR stack").

The terms multilayered antireflective coating is named hereafter "AR coating"; "AR coating" and "AR stack" have not the same meaning.

By outermost layer of the IF or AR coating, it is meant the layer of the IF or AR coating which is the furthest from the substrate.

By innermost layer of the IF or AR coating, it is meant the layer of the IF or AR coating which is the closest to the substrate.

By inner layer of the IF or AR coating, it is meant any layer of the anti-reflection coating except for the outermost layer of said AR coating.

Unless otherwise specified, the refractive indexes referred to in the present application are expressed at 25° C. at a wavelength of 550 nm.

The multilayered antireflective coating according to the invention may be formed on at least one of the main faces of a bare substrate, i.e. an uncoated substrate, or at least one of the main faces of the substrate already coated with one or more functional coatings, such as an anti-abrasion coating.

As used herein, the rear (or the inner or Concave or CC) face of the substrate is intended to mean the face which, when using the article, is the nearest from the wearer's eye. It is generally a concave face. On the contrary, the front face of the substrate (or Convex or CX), is the face which, when using the article, is the most distant from the wearer's eye. It is generally a convex face.

Also, as used herein, a "transparent substrate in the visible light ranges (380-780 nm)" means a substrate that, in at least one angle of incidence, has a light absorption up to 0.2%. Indeed, above 0.2%, a substrate is considered to be opaque.

In one embodiment, the ophthalmic lens according to the invention has a $T_v$ (defined hereafter) which is more than 43%, preferably more than 80%, more preferably higher than or equal to 90%, and even better higher than or equal to 95%.

In addition, according to the invention, the "angle of incidence (symbol 8)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical article/ophthalmic lens of the invention in the international colorimetric system CIE L*a*b* (1976) are calculated between 380 and 780 nm, taking the standard illuminant D 65 and the observer into account (angle of 10°). The observer is a "standard observer" as defined in the international colorimetric system CIE L*a*b*. It is possible to prepare antireflective coatings, without limitation as regards their hue angle ("h°").

The $T_v$ factor, also called "luminous transmission" of the system, is such as defined in the standard ISO 13666:1998 and relates to an average in the 380-780 nm wavelength range that is weighted according to the sensitivity of the eye at each wavelength of the range and measured under D65 illumination conditions (daylight).

In the present description, unless otherwise specified, transmittances/transmissions are measured at the center of the optical article/ophthalmic lens for a thickness ranging from 0.7 to 2 mm, preferably from 0.8 to 1.5 mm, at an angle of incidence ranging from 0° to 15°, preferably 0°. As used herein, the light transmitted refers to light arriving on the front main face of the optical article/ophthalmic lens and that went through the lens.

Herein, the "luminous reflectance" noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

In the present application and unless otherwise specified, $R_v$ factor has been measured at an angle of incidence of 15°.

In the present application, the extension coefficient "k" is related to the absorption coefficient α from Beer-Lambert's law, i.e.: $\alpha = 4\pi k/\lambda$, where λ is the wavelength of light.

The present invention can be used in all kinds of optical devices and elements, such as ophthalmic elements and devices, display elements and devices, windows or mirrors. Non-limiting examples of ophthalmic elements include corrective and non-corrective lenses, including single vision or multi-vision lenses, which may be either segmented or non-segmented, as well as other elements used to correct, protect, or enhance vision, magnifying lenses and protective lenses or visors such as found in spectacles, glasses, goggles and helmets. Non-limiting examples of display elements and devices include screens and monitors. Non-limiting examples of windows include automotive and aircraft transparencies, filters, shutters, and optical switches.

As used herein, an optical article is a transparent optical article such as a lens or lens blank, and more preferably an ophthalmic lens or lens blank. The optical article/ophthalmic lens may be coated on its convex main side (front side), concave main side (back side), or both sides using the process of the invention.

2. The Ophthalmic Lens

As previously mentioned, the optical article and especially the ophthalmic lens according to the invention comprises a transparent substrate such as defined above with a front main face and a rear main face, at least one of said main faces being coated with a multilayered interferential stack (IF stack), preferably an antireflective stack (AR stack), comprising at least one HI layer having a refractive index higher than or equal 1.55 and at least one LI layer having a refractive index lower than 1.55, characterized in that an electrochromic stack (EC stack)
- is part of said multilayered interferential stack, or
- is directly deposited onto said multilayered interferential stack,
- so as to form a multilayered interferential coating (IF coating), preferably a multilayered antireflective coating (AR coating),
- said electrochromic stack being able to reversibly switch from an activated state when an electrical potential is applied to a deactivated state when the reverse electrical potential is applied.

In general, the total thickness of the multilayered interferential coating is equal to or below 1 μm.

In particular, the EC stack comprises a plurality of electrochromic material layers so that the IF coating, preferably the AR coating, according to the invention is formed from the EC stack and the AR stack. As mentioned above, the EC stack contributes to the interferential effect of the IF coating thus formed, that is to say some of the layer of the EC stack contributes with the different layers of the IF stack (i.e. at least the HI layer and the LI layer) to provide an interferential effect.

According to a first embodiment of the invention, the EC stack is part of the IF stack so as to form the IF coating. Hence, in this embodiment, the different layers of the EC stack are included into the different layers of the IF stack. Preferably, all the different layers of the EC stack are placed between two different layers of the IF stack (such as the HI layer and the LI layer). Especially, in this embodiment, the different layers of the EC stack are arranged one above the other, in particular, in direct contact, and the different layers of the IF stack surround the EC stack.

According to second embodiment of the invention, the EC stack is directly deposited onto the IF stack so as to form the IF coating. According to this embodiment, the EC stack is therefore superposed to the IF stack, that is to say the different layers of the EC stack are superposed to the different layers of the IF stack. According to this embodiment, the different layers of the EC stack are also arranged one above the other, in particular, in direct contact and the different layers of the IF stack are also arranged one above the other, in particular, in direct contact.

In general, the electrochromic stack comprises at least five electrochromic material layers that are five ceramic layers disposed successively on each other, preferably each of the at least five ceramic layers is an oxide.

Especially, the electrochromic stack comprises a first and a second transparent conductive electrode layers (named hereafter "TCO layers"), and the following layers placed between said first and a second transparent conductive electrode layers: one electrochromic layer (named hereafter "EC layer"), one ion reservoir layer (named hereafter "IR layer") and one dielectric spacer layer (named hereafter "DS layer"), said DS layer being placed between the EC layer and the IR layer.

In general, the first and the second transparent conductive electrode layers (TCO layers) have a thickness ranging from 5 to 50 nm, preferably ranging from 5 to 30 nm and typically ranging from 5 to 25 nm.

According to the invention, a thickness ranging from 5 to 50 nm includes the following values and any intervals among them: 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 41; 42; 43; 44; 45; 46; 47; 48; 49; 50.

Generally, the electrochromic stack comprises the following stack:
- first TCO layer/EC layer/DS layer/IR layer/second TCO layer; or
- first TCO layer/IR layer/DS layer/EC layer/second TCO layer.

For instance, the first TCO layer and the second TCO layer comprise one or more metal oxides selected from semiconductor oxides, such as $In_2O_3$:Sn or indium tin oxide (ITO), $SnO_2$, Au, Ag, Cu and are preferably ITO layers.

In general, the ITO (tin doped indium oxide) layer is composed of 10% of indium oxide.

The EC layer may comprises one or more cathodic EC materials, such as $WO_3$, $TiO_2$, $Nb_2O_5$, $MoO_3$ and $Ta_2O_5$, $V_2O_5$, $TiO_2$, and is preferably a $WO_3$ layer, or one or more anodic materials, such as NiO, $IrO_2$, $Cr_2O_5$, $MnO_2$, $FeO_2$, $CoO_2$, $V_2O_5$, and is preferably a NiO layer. Generally, the EC layer may comprise a cathodic EC material, such as $WO_3$.

In general, the EC layer has a thickness ranging from 10 to 200 nm, preferably ranging from 20 to 190 nm.

The DS layer may comprise one or more oxide materials selected from $Ta_2O_5$, $SiO_2$, $Al_2O_3$, $TiO_2$, $ZrO_2$, $Nb_2O_5$, $Cr_2O_3$, $Sb_2O_5$, $LiNbO_3$, $LiBO_2$, $LiTaO_3$ and are preferably $Ta_2O_5$ or $SiO_2$.

In general, the DS layer has a thickness ranging from 10 to 200 nm, preferably ranging from 20 to 190 nm.

The IR layer that may be suitable according to the invention comprises one or more anodic materials, such as $ZrO_2$, NiO, $IrO_2$, $Cr_2O_5$, $MnO_2$, $FeO_2$, $CoO_2$, $V_2O_5$ and is preferably a NiO layer.

In general, the IR layer has a thickness ranging from 10 to 200 nm, preferably ranging from 20 to 190 nm.

According to the first embodiment of the invention, said electrochromic stack is preferably disposed between a HI layer or a LI layer and (another) LI layer of the IF coating, preferably of the AR coating.

According to this embodiment of the invention, at least one HI layer, such as two HI layers, and at least one LI layer, such as two LI layers, are disposed between said substrate and said electrochromic stack, the HI layers and LI layers being preferably alternated. In general, at least one HI layer and one LI layer are disposed between said substrate and said electrochromic stack. In particular, the outermost layer of the IF coated thus formed is a LI layer that is preferably disposed onto the electrochromic stack. In particular, the AR stack comprises one HI layer and one LI layer disposed between said substrate and said electrochromic stack and another LI layer disposed above the EC stack (outermost layer).

According to this first embodiment of the invention, the layers of the EC stack are preferably HI and LI layers of the interferential coating and they are interferential layers contributing to the optical properties of the interferential coating. Their thicknesses and materials are chosen to get the desired optical properties of the interferential coating, in combination with other layers of the interferential stack, while still keeping EC properties of the EC stack.

According to second embodiment of the invention, the electrochromic stack is disposed between said substrate and said IF stack, preferably said EC stack being disposed on one side onto the substrate and in the other side in direct contact with the IF stack so as to form a superposition of EC stack+IF stack. According to a characteristic of the invention, said EC stack may be in direct contact with the substrate and according to another characteristic of the invention, the EC stack is not in direct contact with the substrate since this one may be coated with one or more functional coatings, such as described below.

According to this embodiment of the invention, at least one HI layer, such as two HI layers, and at least one LI layer, such as two LI layers, are disposed above said electrochromic stack, the HI layers and LI layers being preferably alternated. In general, at least one HI layer and two LI layers, preferably alternated, are disposed above said electrochromic stack, typically one of said two LI layers being the outermost layer.

Generally, for these two embodiments, the outer layer of said IF coating, preferably AR coating which is the farthest from the substrate is an LI layer.

In particular, the LI layer of the IF stack, preferably the AR stack which is the farthest from the substrate has a physical thickness ranging from 55 to 140 nm, preferably from 60 to 110 nm.

Hence, in general, the IF stack, preferably the AR stack of the invention comprises at least one layer with a high refractive index (HI) and at least one layer with a low refractive index (LI), preferably two LI layers. More preferably, it comprises here a simple stack, since the layer total number in the antireflective coating is higher than or equal to 2, preferably higher than or equal to 3, and preferably lower than or equal to 7, more preferably lower than or equal to 6, even more preferably lower than or equal to 5, and most preferably equal to 3 layers.

As used herein, a layer of the IF coating, preferably the AR coating is defined as having a thickness higher than or equal to 1 nm. Thus, any layer having a thickness lower than 1 nm will not be considered when counting the number of layers in the interferential coating. The sub-layer either is not considered when counting the number of layers of the antireflective coating.

Unless stated otherwise, all thicknesses disclosed in the present application relate to physical thicknesses.

Therefore, in general, the IF coating, preferably the AR coating (comprising both the IF coating (preferably the AR coating) and the EC stack) according to the invention comprises a layer total number higher than or equal to 6, preferably higher than or equal to 7, preferably higher than or equal to 8. The IF coating, preferably the AR coating according to the invention may comprise a layer total number lower than or equal to 15, preferably lower than or equal to 13, preferably lower than or equal to 12, even more preferably lower than or equal to 11, and most preferably equal to 10 layers.

Especially, HI layers and LI layers of the interferential coating do not need to alternate with each other in the stack, although they also may, according to one embodiment of the invention. Thus, two HI layers (or more) may be deposited onto each other, as well as two LI layers (or more) may be deposited onto each other.

In general, the sum of physical thickness of all HI layers in the interferential coating, preferably AR coating is ranging from 15 nm to 260 nm, preferably is ranging from 20 nm to 240 nm.

In the present application, a layer of the interferential coating, preferably antireflective coating is said to be a layer with a high refractive index (HI) when its refractive index is higher than or equal to 1.55, preferably higher than or equal to 1.6, even more preferably higher than or equal to 1.90, such as 1.95 even more preferably higher than or equal to 2.00, such as 2.14.

A layer of the interferential coating, preferably antireflective coating is said to be a low refractive index layer (LI) when its refractive index is lower than 1.55, preferably lower than or equal to 1.50, more preferably lower than or equal to 1.48. Said LI layer preferably has a refractive index higher than 1.36.

Unless otherwise specified, the refractive indexes referred to in the present application are expressed at 25° C. at a wavelength of 550 nm.

The HI layer is a traditional high refractive index layer that is well known in the art. It generally comprises one or more metal oxides such as, without limitation, zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), titanium dioxide ($TiO_2$) and mixtures thereof. The preferred materials include zirconia ($ZrO_2$), tantalum pentoxide ($Ta_2O_5$). Optionally, the HI layers may further contain silica or other materials with a low refractive index, provided they have a refractive index higher than or equal to 1.6 as indicated hereabove. According to a characteristic of the invention, the HI layer does not comprise titanium dioxide ($TiO_2$).

The LI layer is also well known and may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$). Optionally, the LI layers may further contain materials with a high refractive index or very high refractive index, provided the refractive index of the resulting layer is lower than to 1.6.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

The IF coating total thickness is lower than or equal to 1000 nm, preferably lower than or equal to 800 nm, more preferably lower than or equal to 600 nm, and typically lower than or equal to 550 nm and even more preferably lower than or equal to 535 nm. The IF coating total thickness is generally higher than or equal to 100 nm, preferably higher than or equal to 150 nm.

According to the invention, a total thickness lower than or equal 1000 nm includes the following values and any intervals among them: 1000; 950; 900; 850; 800; 750; 700; 650; 600; 550; 500; 540; 530; etc.

According to some embodiments of the invention, the IF coating, such as the AR coating, may comprise in the direction moving away from the substrate, the following layers which are in direct contact with each other:
(1) a HI layer of the IF stack;
(2) a LI layer of the IF stack;
(3) the EC stack such as defined above (i.e. either composed of a first TCO layer/EC layer/DS layer/IR layer/second TCO layer; or composed of a first TCO layer/IR layer/DS layer/EC layer/second TCO layer);
(4) a LI layer of the IF stack.

Especially, according to this embodiment, the IF coating may comprise in the direction moving away from the substrate:
(1) the HI layer having a physical thickness ranging from 15 to 200 nm;
(2) the LI layer having a physical thickness ranging from 8 to 200 nm;
(3) the EC stack such as defined above;
(4) a LI layer having a physical thickness ranging from 60 to 140 nm.

According to another embodiment of the invention, the IF coating may comprise in the direction moving away from the substrate, the following layers which are in direct contact with each other:
(1) the EC stack such as defined above;
(2) a LI layer of the IF stack;
(3) a HI layer of the IF stack and;
(4) a LI layer of the IF stack.

For instance, according to this embodiment, the IF coating may comprise in the direction moving away from the substrate:
(1) the EC stack such as defined above;
(2) the LI layer having a physical thickness ranging from 8 to 200 nm;
(3) the HI layer having a physical thickness ranging from 15 to 200 nm;
(4) the LI layer having a physical thickness ranging from 60 to 140 nm.

According to the invention, a physical thickness "ranging from 8 to 200 nm" "includes the following values and any intervals between them: 8; 9; 10; 11; 12; 13; 14; 15; 16; 17; 18; 19; 20; 25; 30; 35; 40; 45; 50; 55; 60; 65; 70; 75; 80; 85; 90; 95; 100; 105; 110; 120; 130; 140; 150; 160; 170; 180; 190; 200. Also according to the invention, a physical thickness "ranging from 5 to 200 nm" "includes the following values and any intervals between them: 15; 16; 17; 18; 19; 20; 25; 30; 35; 40; 45; 50; 55; 60; 65; 70; 75; 80; 85; 90; 95; 100; 105; 110; 120; 130; 140; 150; 160; 170; 180; 190; 200 and a physical thickness "ranging from 60 to 140 nm" "includes the following values and any intervals between them: 60; 65; 70; 75; 80; 85; 90; 95; 100; 105; 110; 120; 130; 140.

As previously mentioned, the EC stack according to the invention exhibits electrochromic properties, meaning that it reversibly changes color upon the application of an electric potential, or reversible changes color upon changing the magnitude of the electrical potential applied.

In general, the applied electrical potential is ranging from $|0$ (not included) to $2V|$. For instance, an electrical potential of 2V enables to totally switch the EC stack from a deactivated state (initial) that is generally transparent, to an activated state that is colored.

In some embodiments, the electrochromic stack may be at least partially activated, for instance by applying the half of the electrical potential.

Generally, by selecting the suitable materials and thicknesses for the various layers of the IF coating, such as an AR coating, of the invention (i.e. forming from the EC stack and the IF stack), it is possible to obtain different desired optical parameters, such as $R_v$, $R_m$, $R_m^{NIR}$, $R_m^B$.

In some embodiments of the invention, the IF coating, such as an AR coating, is transparent (bleached) when no electrical potential is applied and colored (mirror reflection) when the electrical potential is applied.

Hence, according to this embodiment of the invention, the IF coating has:
a mean light reflection factor in the visible region $R_v$ lower than or equal to 2.5% in the deactivated state, and
a mean light reflection factor in the visible region $R_v$ higher than 2.5%, preferably higher than or equal to 8%, more preferably higher than or equal to 10%, in particular higher than or equal to 14%, in the activated state,
the mean light reflection factor being measured at an angle of incidence lower than 17°.

According to this embodiment of the invention, the IF coating may have:
a transmission factor in the visible range $T_v$ higher than or equal to 90%, more preferably higher than or equal to 95% in the deactivated state and,
a transmission factor in the visible range $T_v$ lower than 65%, more preferably lower than or equal to 55% in the activated state.

Preferably, the transmission of the ophthalmic lens according to the invention also has a $T_v$ within the above ranges.

For instance, the IF coating may have
a chroma C* (in reflection) lower than or equal 12, preferably lower than or equal 10, in the deactivated state, and/or
a chroma C* higher than or equal 15, preferably higher than or equal 20, in the activated state,
the Chroma C* being measured according to the international colorimetric CIE L*a*b* at an angle of incidence (θ) of 15°.

On the contrary, in some other embodiments of the invention, the IF coating is colored (mirror reflection) when no electrical potential is applied and is also colored (mirror reflection) when the electrical potential is applied.

Hence, according to this embodiment of the invention, the IF coating has: a mean light reflection factor in the visible region $R_v$ higher than 2.5%, preferably higher than or equal to 10%, in particular higher than or equal to 14%, in the activated state and in the deactivated state, the mean light reflection factor being measured at an angle of incidence lower than 35°, preferably lower than or equal to 17°.

According to other embodiments of the invention, the IF coating is uncolored both if the activated and in the deactivated states.

In another embodiment, the IF coating may have a mean light reflection factor in the visible region $R_v$ lower than 2.5% in the activated state and in the deactivated state, the mean light reflection factor being measured at an angle of incidence lower than 35°.

In another embodiments, it would be preferable to limit the exposure to potentially harmful blue light (420-450 nm).

For that purpose, the IF coating may have a transmission factor within a range 420 to 450 nm, called hereafter $Tm^{81}$, that is lower than or equal 70%, preferably equal to or lower than 60%, more preferably equal to or lower than 50% and typically lower than or equal to 40%, in the activated state.

As used herein, $Tm^{B1}$ is defined by mean transmission factor of blue light (420-450 nm) (Bad blue light)

$$T_m^{B1} = \frac{\int_{420}^{T450} T(\lambda)d\lambda}{450 - 420}$$

wherein R(λ) represents the reflection factor at wavelength λ.

However, part of blue light, with a wavelength ranging from 465 nm to 495 nm approximately, promotes health since it is implicated in mechanisms for regulating biorhythms, referred to as "circadian cycles".

Therefore, in some embodiments, it would be preferable to not limit the exposure to this "health" blue light (465-495 nm) (good blue light).

Hence, the multilayered IF coating may have a mean in the range 465 to 495 nm, called hereafter $Tm^{B2}$, that is higher than or equal to 10%, preferably higher than or equal to 15%, more preferably higher than or equal to 20% and typically higher than or equal to 25%, such as 30%.

As used herein, $Tm^{B2}$ is defined by the mean transmission factor of blue light (465-495 nm). It has the same definition as $Tm^{B1}$ except that the wavelengths are ranging from 465-495 nm.

In some other embodiments of the invention, it would be preferable to provide an AR film having high reflection in the NIR region (780-1400 nm).

Hence, the multilayered IF coating may have a mean reflectance in the near infrared (NIR) region, called hereafter $R_m(NIR)$, in the 780-1400 nm wavelength range that is higher than or equal to 10%, preferably higher than or equal to 15%, more preferably higher than or equal to 20% and typically higher than or equal to 25%, such as 28%, at an angle of incidence lower than 35° in the activated state.

Herein, the characteristic mean reflection factor in the near infrared (NIR) region $R_m^{NIR}$ (780-1400 nm) is defined by the formula:

$$R_m^{NIR} = \frac{\int_{780}^{1400} R(\lambda)d\lambda}{1400 - 780}$$

wherein R(λ) represents the reflection factor at wavelength λ. $R_m^{NIR}$ can be measured for any angle of incidence θ, based on R(λ) measured at the same angle of incidence.

Therefore, the ophthalmic lens according to the invention may comprise an AR film with high reflection in the NIR region and/or the harmful blue light region and this by applying an electrical potential that is performed by the wearer of the ophthalmic lens and therefore according to his needs.

In some other embodiments of the invention, it is preferable to protect the wearer's eyes from the reflects directed to his eyes.

For that purpose, the multilayered IF coating may have in the activated state:
a mean light reflection factor in the visible region $R_v$ on the front main face, called "front side reflection" that is higher than or equal to 5.0%, and a mean light reflection factor in the visible region $R_v$ on the rear main face, called "back side reflection"; that is lower than 2.5%, preferably lower than or equal to 1.0%, in particular lower than or equal to 0.5%, the mean light reflection factor being measured at an angle of incidence lower than 35°.

In general, the antireflective coating may be deposited onto a sub-layer. It should be noted that such sub-layer does not belong to the antireflective coating.

As used herein, a sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying substrate (which is generally the anti-abrasion and anti-scratch coating or the bare substrate).

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $T_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

According to an embodiment, the antireflective coating is not deposited onto a sub-layer such as described above.

The various layers of the IF coating and the optional sub-layer are preferably deposited by vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the IF coating and of the optional sub-layer is conducted by evaporation under vacuum or sputtering.

Generally speaking, the IF coating of the ophthalmic lens according to the invention may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly (ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth) acrylic acid and esters thereof, which may be derived from bisphenol A; polymer and copolymer of thio(meth)

acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth) acrylic copolymers, having a refractive index between 1.54 and 1.58, polymer and copolymer of thiourethane, polycarbonates are preferred.

As it will be described hereafter, the substrate may be coated with one or more functional coatings prior to depositing the IF coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Prior to depositing the IF coating, preferably the AR coating, the surface of said substrate is usually submitted to a physical or chemical surface activating treatment, so as to reinforce the adhesion of the IF coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

In particular, the IF coating is placed on the front main face of the ophthalmic lens or in the rear main face of the ophthalmic lens, preferably the front main face.

In an embodiment of the invention, the front face and the rear face of the ophthalmic lens of the invention are coated with the IF coating described above.

Generally, the front and/or rear main face of the substrate onto which the IF coating will be deposited is coated with an impact-resistant primer layer, with an anti-abrasion and/or anti-scratch coating, or with an impact-resistant primer layer coated with an anti-abrasion and/or anti-scratch coating.

The IF coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 μm, preferably of from 0.5 to 1.5 μm.

The ophthalmic lens according to the invention may also comprise coatings formed on the IF coating and capable of modifying the surface properties thereof, such as hydrophobic and/or oleophobic coatings (antifouling top coat). These coatings are preferably deposited onto the outer layer of the IF coating of the invention. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, the ophthalmic lens according to the invention comprises a substrate that is successively coated on its rear face with an impact-resistant primer layer, an anti-abrasion and scratch-resistant layer, the IF coating according to the invention, and with a hydrophobic and/or oleophobic coating, or with a hydrophilic coating which provides antifog properties, or an antifog precursor coating.

The ophthalmic lens according to the invention is preferably an ophthalmic lens for spectacles (spectacle lens), or a blank for ophthalmic lenses.

In particular, the ophthalmic lens comprises a means to provide an electrical potential, such as a battery, this means being able to be activated/deactivated (on-off button) by the consumer.

The invention is further illustrated by the examples described below. These examples are meant to illustrate the invention and are not to be interpreted as limiting the scope of the invention.

EXAMPLES

1. General Procedures

The ophthalmic lenses used in the examples comprise a lens substrate Orma® having a 65 mm diameter, a refractive index of 1.5 or a substrate of 1.56 or 1.6 refractive index, and a power of—2.00 diopters, coated with a hard coat layer of refractive index 1.5 (such as those described in EP0614957) or 1.6.

The ITO (tin doped indium oxide) layer is composed of 10% of indium oxide.

The layers of the antireflective coating were deposited without heating the substrates by evaporation under vacuum (evaporation source: electron gun) on the front main face on said substrate.

A hydrophobic and oleophobic coating layer of Optool DSX from Daikin was deposited by vacuum evaporation onto the antireflective coating. The thickness of the resulting hydrophobic and oleophobic coating ranged from 2 to 5 nm.

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making ophthalmic lenses comprises the step of introducing the substrate, a step of activating the surface of the substrate by means of an argon ion beam (anode current: 1 A, anode voltage: 100 V, neutralization current: 130 mA), turning the ion irradiation off, forming the vernis and the sub-layer on the substrate by evaporation, then subsequently the various layers of the antireflective coating by successive evaporations and at last a ventilation step.

The conditions of the deposition of the different layers are as follows (Table 1):

TABLE 1

| Material deposited | Deposition rate | Pressure | Gas | Ion assistance |
|---|---|---|---|---|
| $ZrO_2$ | 0.3 to 0.5 nm/s | $6.10^5$ mBar | Oxygen | — |
| $SiO_2$ | 0.3 to 0.5 nm/s | — | Oxygen | — |
| ITO | 0.3 to 0.5 nm/s | — | Oxygen | 3.5 A-140 V |
| $WO_3$ | 0.3 to 0.5 nm/s | — | Oxygen | — |
| NiO | 0.3 to 0.5 nm/s | — | Oxygen | — |
| $Ta_2O_5$ | 0.3 to 0.5 nm/s | — | oxygen | 3.5 A -140 V |

3. Results

The reflection mean factor values are those of the front face except, unless otherwise indicated. The optical parameters, such as $R_v$, $R_m$ and $R_{uv}$, etc. factors are provided for an angle of incidence θ of 15° and the colorimetric coefficients of the ophthalmic lens of the invention in the international colorimetric system CIE L*a*b* (1976) are calculated between 380 and 780 nm, taking the standard illuminant D 65 at various angle of incidence 0 and the observer into account (angle of 10°) (for all the examples). The colorimetric coefficients including C* and h* are for reflection measurements.

3.1 Examples of Ophthalmic Lenses According to the AR Coating According to the Invention

TABLE 2

| Configuration 1 | Configuration 2 |
|---|---|
| Substrate + hard coat | Substrate + hard coat |
| $ZrO_2$ | ITO (electrode) |
| $SiO_2$ | $ZrO_2$ (IR layer) |
| ITO (electrode) | $SiO_2$ (DS layer) |
| $WO_3$ (EC layer) | $WO_3$ (EC layer) |
| $SiO_2$ (DS layer) | ITO ITO (electrode) |
| $ZrO_2$ (IR layer) | $SiO_2$ |
| ITO (electrode) | $ZrO_2$ |
| $SiO_2$ | $SiO_2$ |

In the configuration 1, the different layers of the electrochromic stack is part of the IF coating, whereas in configuration 2, the electrochromic stack is disposed between the substrate and the IF coating, such as an AR coating, especially it is in direct contact with it.

In these two configurations, it is possible to modulate the reflection between the deactivated state and the activated state of the electrochromic stack since the modification of the refractive index of the EC layer of the EC stack will imply a modification of the layers of the electrochromic stack will change the optical properties of the IF coating of the invention.

3.2 Examples of ophthalmic lenses according to the invention comprising the above described configuration 1 (i.e. the nearest layer of the IF coating from the substrate is $ZrO_2$) wherein $R_v \leq 2.5\%$ in the deactivated state and $R_v \geq 10\%$ in the activated state.

Table 3 below shows different examples according to the invention that have been performed on substrate and coating such as described above having a refractive index of 1.5. Examples with 0 thickness means that the layer has not been deposited and/or is not needed.

TABLE 3

| | Thickness | | | | | | | | Deactivated (initial) | | | | Activated | | | |
|---|---|---|---|---|---|---|---|---|---|---|---|---|---|---|---|---|
| Ex | $ZrO_2$ | $SiO_2$ | ITO | $WO_3$ | $SiO_2$ | $ZrO_2$ | ITO | $SiO_2$ | Rv | Tv | C* | h | Rv | Tv | C* | h |
| 1 | 40 | 30 | 20 | 60 | 20 | 40 | 20 | 70 | 2.4 | 97.9 | 38 | −38.4 | 14 | 48.9 | 40.9 | 96.2 |
| 2 | 50 | 30 | 20 | 60 | 20 | 50 | 20 | 70 | 2.4 | 97.9 | 61.1 | −41.8 | 14.1 | 46.7 | 47.5 | 85.01 |
| 3 | 80 | 10 | 20 | 50 | 50 | 80 | 20 | 110 | 2.4 | 97.9 | 89.8 | −49.1 | 14.2 | 52.3 | 7.23 | −56.97 |
| 4 | 60 | 20 | 20 | 60 | 50 | 70 | 20 | 120 | 2.3 | 98 | 102 | −49.7 | 14.1 | 47.2 | 11.9 | −77.34 |
| 5 | 50 | 30 | 20 | 50 | 50 | 70 | 20 | 120 | 2.3 | 98 | 89.5 | −49.7 | 14.2 | 52.2 | 7.82 | −112.6 |
| 6 | 50 | 30 | 20 | 60 | 40 | 70 | 20 | 130 | 2.5 | 97.4 | 99.6 | −49.9 | 14.3 | 46.5 | 13.4 | −110.5 |
| 7 | 60 | 10 | 20 | 70 | 20 | 110 | 20 | 100 | 1.0 | 99.3 | 78 | −47 | 10.0 | 47 | 16 | 110 |
| 8 | 50 | 10 | 20 | 60 | 80 | 10 | 20 | 0 | 1.9 | 97.8 | 6.3 | −125.5 | 10.7 | 54 | 16.3 | 142.6 |
| 9 | 30 | 30 | 20 | 50 | 30 | 20 | 20 | 60 | 1.9 | 98.4 | 5.5 | −123 | 10.8 | 58 | 16.2 | 152 |
| 10 | 30 | 20 | 20 | 70 | 20 | 20 | 20 | 70 | 1.8 | 98.1 | 8.6 | −105.9 | 10.2 | 49.1 | 21.3 | 124.1 |
| 11 | 30 | 30 | 20 | 50 | 20 | 30 | 20 | 70 | 2 | 98.3 | 1 | 112.35 | 11.2 | 57.8 | 23.4 | 123.7 |
| 12 | 30 | 20 | 20 | 60 | 10 | 40 | 20 | 80 | 2 | 97.9 | 8.2 | 120.46 | 10.6 | 54.4 | 34.6 | 103.2 |
| 13 | 20 | 40 | 20 | 40 | 20 | 40 | 20 | 70 | 1.8 | 98.5 | 3.3 | −37.15 | 10.3 | 63 | 22.5 | 118.2 |
| 14 | 20 | 30 | 20 | 50 | 10 | 50 | 20 | 70 | 1.8 | 98.5 | 7.2 | −125.1 | 10.3 | 58.8 | 25.1 | 111.1 |

TABLE 3-continued

| | Thickness | | | | | | | | Deactivated (initial) | | | | Activated | | | |
|---|---|---|---|---|---|---|---|---|---|---|---|---|---|---|---|---|
| Ex | $ZrO_2$ | $SiO_2$ | ITO | $WO_3$ | $SiO_2$ | $ZrO_2$ | ITO | $SiO_2$ | Rv | Tv | C* | h | Rv | Tv | C* | h |
| 15 | 20 | 30 | 20 | 60 | 0 | 60 | 20 | 60 | 1.9 | 98.4 | 8.3 | −81.71 | 11 | 53.1 | 26.4 | 110.5 |
| 16 | 20 | 40 | 20 | 40 | 10 | 70 | 20 | 70 | 1.9 | 98.4 | 5.4 | −4.8 | 10 | 63.2 | 41.2 | 91.63 |
| 17 | 70 | 0 | 20 | 60 | 20 | 150 | 20 | 80 | 2 | 98.1 | 4.6 | −153.8 | 10.5 | 53.3 | 39.3 | 123.3 |
| 18 | 80 | 0 | 20 | 50 | 20 | 150 | 20 | 90 | 2 | 98.3 | 9.8 | −38.1 | 10.7 | 57.6 | 47.9 | 107 |
| 19 | 60 | 10 | 20 | 50 | 20 | 140 | 20 | 90 | 1.9 | 98.4 | 5.9 | −91.76 | 10.8 | 58.4 | 40.3 | 117.5 |
| 20 | 50 | 10 | 20 | 60 | 20 | 140 | 20 | 90 | 1.9 | 98.4 | 5.8 | −110.3 | 10.8 | 54 | 41 | 116.3 |
| 21 | 40 | 30 | 20 | 40 | 30 | 140 | 20 | 90 | 1.7 | 98.4 | 7.1 | −120.1 | 10.3 | 63.1 | 40.2 | 120.6 |
| 22 | 50 | 20 | 20 | 50 | 30 | 150 | 20 | 80 | 2 | 97.9 | 7.9 | −103.1 | 11.5 | 56.9 | 41.3 | 123.8 |
| 23 | 40 | 30 | 20 | 40 | 30 | 150 | 20 | 90 | 2 | 97.9 | 6.8 | 139.84 | 10.8 | 62.7 | 39.6 | 115.3 |

3.3 Examples of ophthalmic lenses according to the invention comprising the above described configuration 1 (i.e. the nearest layer of the IF coating from the substrate is $ZrO_2$) wherein $R_v \geq 2.5\%$ in the deactivated state and $R_v \geq 10\%$ in the activated state.

The examples of tables 4 and 5 below were also done substrate/coating having a refractive index of 1.5.

TABLE 4

| | Thickness | | | | | | | | Deactivated (initial) | | | |
|---|---|---|---|---|---|---|---|---|---|---|---|---|
| Ex | $ZrO_2$ | $SiO_2$ | ITO | $WO_3$ | $SiO_2$ | $ZrO_2$ | ITO | $SiO_2$ | Rv | Tv | C* | h |
| 24 | 30 | 10 | 20 | 20 | 40 | 110 | 20 | 10 | 23.8 | 76.5 | 35.5 | 111.4 |
| 25 | 150 | 20 | 20 | 130 | 110 | 60 | 20 | 60 | 13.9 | 86.4 | 34.5 | 103.73 |
| 26 | 20 | 140 | 20 | 10 | 150 | 110 | 20 | 130 | 18.2 | 81.6 | 31.1 | 114.81 |
| 27 | 20 | 20 | 20 | 60 | 30 | 70 | 20 | 70 | 12.9 | 87.3 | 21.1 | 103.76 |
| 28 | 70 | 0 | 20 | 120 | 60 | 30 | 20 | 30 | 13 | 87.3 | 34 | −131.9 |
| 29 | 100 | 150 | 20 | 70 | 70 | 120 | 20 | 110 | 19.9 | 80.3 | 19.3 | 59.63 |

TABLE 5

| | Thickness | | | | | | | | Activated | | | | |
|---|---|---|---|---|---|---|---|---|---|---|---|---|---|
| Ex | $ZrO_2$ | $SiO_2$ | ITO | $WO_3$ | $SiO_2$ | $ZrO_2$ | ITO | $SiO_2$ | Rv | Tv | C* | h | |
| 24 | 30 | 10 | 20 | 20 | 40 | 110 | 20 | 10 | 26 | 63.5 | 43.9 | 100.2 | More yellow |
| 25 | 150 | 20 | 20 | 130 | 110 | 60 | 20 | 60 | 10.1 | 25.6 | 42.2 | 71.29 | More red |
| 26 | 20 | 140 | 20 | 10 | 150 | 110 | 20 | 130 | 12.5 | 76.3 | 23.1 | 121.8 | darker |
| 27 | 20 | 20 | 20 | 60 | 30 | 70 | 20 | 70 | 18.8 | 49.5 | 35.8 | 85.19 | brighter |
| 28 | 70 | 0 | 20 | 120 | 60 | 30 | 20 | 30 | 17.7 | 24.3 | 19.5 | 55.33 | Blue to pink |
| 29 | 100 | 150 | 20 | 70 | 70 | 120 | 20 | 110 | 20.8 | 44.9 | 48.2 | 83.03 | Orange to yellow |

3.4 Examples of Ophthalmic Lenses According to the Invention Having a Protection Against Bad Blue Light Transmission (TmB1).

The examples of tables 6 and 7 below were also done substrate/coating having a refractive index of 1.5.

TABLE 6

| | Thickness | | | | | | | | Deactivated (initial) | | | | |
|---|---|---|---|---|---|---|---|---|---|---|---|---|---|
| Ex | $ZrO_2$ | $SiO_2$ | ITO | $WO_3$ | $SiO_2$ | $ZrO_2$ | ITO | $SiO_2$ | Rv | Tv | TmB1 | C* | h |
| 30 | 135 | 180 | 20 | 120 | 180 | 30 | 20 | 90 | 1.91 | 98.02 | 98 | 4.58 | 44.73 |
| 31 | 165 | 30 | 20 | 180 | 30 | 15 | 20 | 60 | 1.44 | 98.49 | 73.8 | 84.1 | −43 |
| 32 | 45 | 15 | 20 | 180 | 180 | 60 | 20 | 75 | 1.57 | 96.78 | 87.5 | 43.25 | −40.84 |
| 33 | 165 | 30 | 20 | 90 | 30 | 15 | 20 | 45 | 0.92 | 98.92 | 76.8 | 85.59 | −46.57 |
| 34 | 30 | 30 | 20 | 180 | 30 | 150 | 20 | 75 | 1.46 | 98.29 | 86.6 | 49.48 | 60.79 |

TABLE 7

| | | | Thickness | | | | | | Activated | | | |
|---|---|---|---|---|---|---|---|---|---|---|---|---|
| Ex | ZrO$_2$ | SiO$_2$ | ITO | WO$_3$ | SiO$_2$ | ZrO$_2$ | ITO | SiO$_2$ | Rv | Tv | TmB1 | C* | h |
| 30 | 135 | 180 | 20 | 120 | 180 | 30 | 20 | 90 | 2.08 | 30.18 | 46.6 | 19.74 | −179.8 |
| 31 | 165 | 30 | 20 | 180 | 30 | 15 | 20 | 60 | 5.8 | 15.57 | 28.4 | 8.09 | −179.79 |
| 32 | 45 | 15 | 20 | 180 | 180 | 60 | 20 | 75 | 3..33 | 15.98 | 31.8 | 19.94 | −179.77 |
| 33 | 165 | 30 | 20 | 90 | 30 | 15 | 20 | 45 | 5.94 | 39.46 | 48.5 | 6.27 | −179.73 |
| 34 | 30 | 30 | 20 | 180 | 30 | 150 | 20 | 75 | 5.66 | 15.62 | 31.6 | 26.34 | 179.63 |

3.5 Examples of Ophthalmic Lenses According to the Invention: Good Blue, TmB2.

The examples of tables 8 and 9 below were also done substrate/coating having a refractive index of 1.5.

TABLE 8

| | | | Thickness | | | | | | Deactivated (initial) | | | |
|---|---|---|---|---|---|---|---|---|---|---|---|---|
| Ex | ZrO$_2$ | SiO$_2$ | ITO | WO$_3$ | SiO$_2$ | ZrO$_2$ | ITO | SiO$_2$ | Rv | Tv | TmB2 | C* | h |
| 35 | 30 | 30 | 20 | 105 | 45 | 15 | 20 | 0 | 1.57 | 98.36 | 99.3 | 20.02 | −23.3 |
| 36 | 135 | 180 | 20 | 120 | 180 | 30 | 20 | 90 | 1.91 | 98.02 | 98.7 | 4.58 | 44.7 |
| 37 | 60 | 15 | 20 | 150 | 0 | 150 | 20 | 90 | 1.67 | 98.18 | 98.6 | 34.95 | −51.9 |
| 38 | 150 | 45 | 20 | 135 | 180 | 135 | 20 | 105 | 1.83 | 97.98 | 98.8 | 42.01 | −51.3 |
| 39 | 30 | 15 | 20 | 165 | 0 | 165 | 20 | 75 | 1.81 | 97.99 | 98.5 | 30.12 | 29.2 |

TABLE 9

| | | | Thickness | | | | | | Activated | | | |
|---|---|---|---|---|---|---|---|---|---|---|---|---|
| Ex | ZrO$_2$ | SiO$_2$ | ITO | WO$_3$ | SiO$_2$ | ZrO$_2$ | ITO | SiO$_2$ | Rv | Tv | TmB2 | C* | h |
| 35 | 30 | 30 | 20 | 105 | 45 | 15 | 20 | 0 | 2.03 | 34.76 | 43 | 9.82 | −179.9 |
| 36 | 135 | 180 | 20 | 120 | 180 | 30 | 20 | 90 | 2.08 | 30.18 | 39.8 | 19.74 | −179.8 |
| 37 | 60 | 15 | 20 | 150 | 0 | 150 | 20 | 90 | 1.32 | 21.08 | 29.7 | 18.04 | −179.0 |
| 38 | 150 | 45 | 20 | 135 | 180 | 135 | 20 | 105 | 2.4 | 25.44 | 32.7 | 24.4 | −179.0 |
| 39 | 30 | 15 | 20 | 165 | 0 | 165 | 20 | 75 | 1.76 | 19.2 | 28.1 | 14.28 | −178.6 |

3.6 Examples of Ophthalmic Lenses According to the Invention Having a Protection Against NIR The examples of tables 10 and 11 below were also done substrate/coating having a refractive index of 1.5.

TABLE 10

| | | | Thickness | | | | | | Deactivated (initial) | | | |
|---|---|---|---|---|---|---|---|---|---|---|---|---|
| Ex | ZrO$_2$ | SiO$_2$ | ITO | WO$_3$ | SiO$_2$ | ZrO$_2$ | ITO | SiO$_2$ | Rv | Tv | R$_m^{NIR}$ | C* | h |
| 40 | 45 | 15 | 20 | 60 | 150 | 105 | 20 | 60 | 1.11 | 98.74 | 25.9 | 37.3 | −64.14 |
| 41 | 15 | 45 | 20 | 30 | 165 | 105 | 20 | 60 | 1.85 | 98.09 | 20.1 | 12.6 | −102.6 |
| 42 | 135 | 180 | 20 | 120 | 150 | 105 | 20 | 75 | 1.35 | 97.19 | 34.9 | 10.25 | −96.11 |
| 43 | 30 | 30 | 20 | 30 | 165 | 105 | 20 | 60 | 1.62 | 98.21 | 22 | 17.09 | 169.1 |
| 44 | 120 | 165 | 20 | 30 | 180 | 75 | 20 | 75 | 1.12 | 98.25 | 22.8 | 48.86 | −35.05 |

TABLE 11

| | | | Thickness | | | | | | Activated | | | |
|---|---|---|---|---|---|---|---|---|---|---|---|---|
| Ex | ZrO$_2$ | SiO$_2$ | ITO | WO$_3$ | SiO$_2$ | ZrO$_2$ | ITO | SiO$_2$ | Rv | Tv | R$_m^{NIR}$1 | C* | h |
| 40 | 45 | 15 | 20 | 60 | 150 | 105 | 20 | 60 | 5.62 | 56.16 | 36.7 | 33.87 | 116.76 |
| 41 | 15 | 45 | 20 | 30 | 165 | 105 | 20 | 60 | 2.99 | 73.22 | 27.1 | 33.66 | 135.19 |
| 42 | 135 | 180 | 20 | 120 | 150 | 105 | 20 | 75 | 1.41 | 30.44 | 35.2 | 6.78 | 66.61 |
| 43 | 30 | 30 | 20 | 30 | 165 | 105 | 20 | 60 | 5.28 | 73.64 | 29 | 34.11 | 134.35 |
| 44 | 120 | 165 | 20 | 30 | 180 | 75 | 20 | 75 | 2.26 | 74.82 | 22.4 | 5.76 | −72.63 |

3.7 Example of Lens Wherein the EC Goes from the Deactivated State/an Intermediate State and then the Activated State According to an embodiment of the invention, it is possible to have an intermediate state. Indeed a lens may present a first mirror reflection in the deactivated state, then a second mirror reflection in the intermediate state and finally a third mirror reflection in the activated state. For that purpose, the EC stack is activated at 50% and then at 100% by applying first half of the electrical potential (1V) and then the totality of the electrical potential (2V)

TABLE 12

Example 45
Substrate + hard coat having a refractive index of 1.5

| | |
|---|---|
| $ZrO_2$ | 75 |
| $SiO_2$ | 30 |
| ITO | 20 |
| $WO_3$ | 105 |
| $SiO_2$ | 60 |
| $ZrO_2$ | 30 |
| ITO | 20 |
| $SiO_2$ | 90 |

Air

| | Initial (deactivated) | Intermediate (50%) | Activated (100%) |
|---|---|---|---|
| Rv | 25.98 | 15.12 | 12.45 |
| C* | 44.62 | 25.96 | 12.02 |
| h | 122.66 | 142.26 | 81.92 |

3.8 Examples of Lenses Having Asymmetric Reflection Between the Front Main Face and the Rear Main Face of the Lens.

The following embodiments of lenses enable to obtain an asymmetrical reflection between the front main face and the rear main face of the lens. Especially, these embodiments enable to provide an aesthetic function, i.e. having a mirror reflection in front of the lens without having a mirror in the rear face of the lens (back), that is to say directed toward the eyes of the wearer.

Examples 46 to 46-3

Features of materials involved.

TABLE 12-1

| Material | Refractive index | Extinction coefficient | Refractive index (activated) | Extinction coefficient (activated) |
|---|---|---|---|---|
| $SiO_2$ | 1.47 | 0 | | |
| $ZrO_2$ | 2 | 0 | | |
| NiO | 1.84 | 0.08 | 2.05 | 0.32 |
| $Ta_2O_5$ | 2.14 | 0 | | |
| $WO_3$ | 2.14 | 0 | 1.76 | 0.44 |
| ITO | 2.06 | 0.049 | | |
| Hard coat | 1.49 | 0 | | |

Ref wavelength: 550 nm

Example 46

TABLE 13

| Material | Physical thickness (nm) |
|---|---|
| air | |
| $SiO_2$ | 99 |
| $ZrO_2$ | 77 |
| $SiO_2$ | 32 |
| ITO | 20 |
| NiO | 50 |
| $SiO_2$ | 15 |
| $Ta_2O_5$ | 151 |
| $SiO_2$ | 27 |
| $WO_3$ | 118 |
| ITO | 20 |
| $SiO_2$ | 151 |
| $ZrO_2$ | 93 |
| $SiO_2$ | 10 |
| $ZrO_2$ | 27 |
| Hard coat | |

Performances:
Front side: Rv=1.2% Front side (activated); Rv=10.3%
Back side: Rv=0.7% Back side (activated): 0.5%

Example 46-1

TABLE 13-1

| Material | Physical thickness (nm) |
|---|---|
| air | |
| $SiO_2$ | 118 |
| ITO | 20 |
| NiO | 72 |
| $Ta_2O_5$ | 164 |
| $WO_3$ | 69 |
| ITO | 20 |
| $SiO_2$ | 151 |
| $ZrO_2$ | 109 |
| $SiO_2$ | 142 |
| $ZrO_2$ | 126 |
| Hard coat | |

Performances:
Front side: Rv=1.6% Front side (activated); Rv=8.3%
Back side: Rv=1% Back side (activated): 1%

Example 46-2

TABLE 13-2

| Material | Physical thickness (nm) |
|---|---|
| air | |
| $SiO_2$ | 114 |
| ITO | 20 |
| NiO | 65 |
| $Ta_2O_5$ | 170 |

TABLE 13-2-continued

| Material | Physical thickness (nm) |
|---|---|
| WO$_3$ | 61 |
| ITO | 20 |
| SiO$_2$ | 147 |
| ZrO$_2$ | 120 |
| Hard coat | |

Performances:
Front side: Rv=1.7% Front side (activated); Rv=8.3%
Back side: Rv=1.4% Back side (activated): 0.9%

Example 46-3

TABLE 13-3

| Material | Physical thickness (nm) |
|---|---|
| air | |
| SiO$_2$ | 112 |
| ITO | 20 |
| NiO | 74 |
| Ta$_2$O$_5$ | 167 |
| WO$_3$ | 79 |
| ITO | 20 |
| Hard coat | |

Performances:
Front side: R=2.3% Front side (activated); Rv=7.4%
Back side: Rv=2.5% Back side (activated): 0.7%

TABLE 14

| Example 47 Substrate + hard coat having a refractive index of 1.6 | |
|---|---|
| Ta$_2$O$_5$ | 33.6 |
| SiO$_2$ | 14 |
| ITO | 20 |
| WO$_3$ | 102 |
| SiO$_2$ | 18.3 |
| Ta$_2$O$_5$ | 98.8 |
| ITO | 20 |
| SiO$_2$ | 13.1 |
| Ta$_2$O$_5$ | 121 |
| SiO$_2$ | 93 |
| Air | |

| Front and back non-activated | | | Front activated | | | Back activated | | |
|---|---|---|---|---|---|---|---|---|
| Rv | h | C* | Rv | h | C* | Rv | h | C* |
| 2.3 | −70 | 31 | 10.5 | 80 | 25 | 2.3 | −55 | 14 |

The examples of tables 15 and 16 below were also done substrate/coating having a refractive index of 1.6.

TABLE 15

| # | Air/SiO2 | Ta$_2$O5 | SiO$_2$ | Ta$_2$O5 | ITO | Ta$_2$O5 | SiO$_2$ | WO$_3$ | ITO | SiO$_2$ | Ta$_2$O5 | Substrate |
|---|---|---|---|---|---|---|---|---|---|---|---|---|
| 48 | 83.1 | 117 | 14.7 | 13.3 | 20 | 150 | 22.5 | 59.5 | 20 | 9.7 | 20.9 | |
| 52 | 5.8 | 7 | 60.4 | 43.6 | 20 | 39.7 | 44.1 | 44.2 | 20 | 22.3 | 29.3 | |
| 53 | 78.2 | 112 | 5.7 | 49.6 | 20 | 50.3 | 32.7 | 83.7 | 20 | 0.2 | 28.4 | |
| 54 | 87.8 | 124 | 0.7 | 35.8 | 20 | 39.4 | 19.4 | 75.2 | 20 | 14.4 | 20.1 | |
| 55 | 99.4 | 74.4 | 7.9 | 66 | 20 | 66.1 | 25.3 | 85.8 | 20 | 0.6 | 26.2 | |

TABLE 16

| | Front and back non-activated | | | Front activated | | | Back activated | | | Transmission activated | | |
|---|---|---|---|---|---|---|---|---|---|---|---|---|
| # | Rv | h | C | Rv | h | C | Rv | h | c | Tv | h | C |
| 48 | 2.43 | −83.47 | 20.23 | 10.4 | −125.38 | 8.84 | 2.35 | 129 | 5.4 | 51.9 | 264 | 3.5 |
| 49 | 2.38 | −52.64 | 46.8 | 10.2 | −31.16 | 2.51 | 1.74 | 190 | 4.2 | 58.3 | 237 | 2.7 |
| 50 | 2.45 | −20.31 | 43.5 | 11.1 | 63.37 | 40.38 | 1.91 | 193 | 12.5 | 39.7 | 249 | 12.2 |
| 51 | 2.36 | 3.98 | 21.05 | 10.4 | 70.49 | 32.04 | 1.33 | −72 | 8.8 | 43.8 | 254 | 11.4 |
| 52 | 2.26 | −14.77 | 18.82 | 11.3 | 79.94 | 41.34 | 2.07 | −87 | 12.4 | 38.8 | 259 | 11.8 |

The invention claimed is:

1. An ophthalmic lens comprising:
a transparent substrate with a front main face and a rear main face, at least one of said main faces being coated with a multilayered interferential (IF) stack comprising at least one HI layer having a refractive index higher than or equal to 1.55 and at least one LI layer having a refractive index lower than 1.55; and
an electrochromic (EC) stack that is one of: (i) part of said multilayered interferential stack, and (ii) directly deposited onto said multilayered interferential stack, to form a multilayered interferential (IF) coating that is able to modulate reflection, the EC stack being configured to reversibly switch from an activated state when an electrical potential is applied to a deactivated state when a reverse electrical is applied and to contribute to an interferential effect of the multilayered IF coating, and
wherein a total thickness of the multilayered IF coating including the EC stack is equal to or below 1 μm.

2. The ophthalmic lens according to claim 1, wherein the electrochromic stack comprises at least five ceramic layers disposed successively on each other.

3. The ophthalmic lens according to claim 2, wherein the electrochromic stack comprises first and second transparent conductive (TCO) electrode layers have a thickness ranging from 5 to 50.

4. The ophthalmic lens according to claim 3, wherein the electrochromic stack comprises a first and a second transparent conductive electrode (TCO) layers, and the following layers placed between said first and a second transparent conductive electrode layers: one electrochromic (EC) layer, one ion reservoir (IR) layer and one dielectric spacer (DS) layer, said DS layer being placed between the EC layer and the IR layer.

5. The ophthalmic lens according to claim 4, wherein the electrochromic stack comprises the following stack, starting from the substrate:
first TCO layer/EC layer/DS layer/IR layer/second TCO layer, or
first TCO layer/IR layer/DS layer/EC layer/second TCO layer.

6. The ophthalmic lens according to claim 3, wherein the first and the second transparent conductive electrode (TCO) layers have a thickness ranging from 5 to 30 nm.

7. The ophthalmic lens according to claim 6, wherein the first and the second transparent conductive electrode (TCO) layers have a thickness ranging from 5 to 25 nm.

8. The ophthalmic lens according to claim 1, wherein said electrochromic stack is disposed between said at least one HI layer and said at least one LI layer of the multilayered interferential stack.

9. The ophthalmic lens according to claim 1, wherein at least one HI layer and at least one LI layer are disposed between said substrate and said electrochromic stack, the HI layers and LI layers being preferably alternated.

10. The ophthalmic lens according to claim 1, wherein the electrochromic stack is disposed between said substrate and said multilayered interferential stack.

11. The ophthalmic lens according to claim 1, wherein the multilayered interferential coating has:
a mean light reflection factor in the visible region Rv lower than or equal to 2.5% in a deactivated state, and
a mean light reflection factor in the visible region Rv higher than 2.5%, in an activated state,
the mean light reflection factor being measured at an angle of incidence lower than 35°.

12. The ophthalmic lens according to claim 11, wherein the multilayered interferential coating has:
a transmission factor in the visible range Rv higher than or equal to 70% in the deactivated state, and
a transmission factor in the visible range Rv lower than 65% in the activated state.

13. The ophthalmic lens according to claim 11, wherein the multilayered interferential coating has:
a chroma C* lower than or equal 12 in the deactivated state,
a chroma C* higher than or equal 15 in the activated state,
the Chroma C* being measured according to the international colorimetric CIE L*a*b* at an angle of incidence of 15°.

14. The ophthalmic lens according to claim 1, wherein the multilayered interferential coating has a mean light reflection factor in the visible region Rv higher than 2.5% in an activated state and in a deactivated state, the mean light reflection factor being measured at an angle of incidence lower than 35°.

15. The ophthalmic lens according to claim 1, wherein the multilayered interferential coating has a mean light reflection factor in the visible region Rv lower than 2.5% in an activated state and in a deactivated state, the mean light reflection factor being measured at an angle of incidence lower than 35°.

16. The ophthalmic lens according to claim 1, wherein the multilayered interferential coating has one or more of:
(i) a mean transmission factor TmB1, in the range between 420-450 nm that is lower than or equal to 70% in the activated state, and
(ii) a mean transmission factor TmB2, in the range between 465 to 495 nm, that is higher than 10% in the activated state.

17. The ophthalmic lens according to claim 1, wherein the multilayered interferential coating has a mean reflectance in the near infrared (NIR) region (RmNIR) in the 780-1400 nm wavelength range that is higher than or equal to 10%, at an angle of incidence lower than 35° in the activated state and/or the deactivated state.

18. The ophthalmic lens according to claim 17, wherein the mean reflectance in the near infrared (NIR) region (RmNIR) in the 780-1400 nm wavelength range is higher than or equal to 15%, at the angle of incidence lower than 35° in the activated state and/or the deactivated state.

19. The ophthalmic lens according to claim 18, wherein the mean reflectance in the near infrared (NIR) region (RmNIR) in the 780-1400 nm wavelength range is higher than or equal to 20%, at the angle of incidence lower than 35° in the activated state and/or the deactivated state.

20. The ophthalmic lens according to claim 1, wherein the multilayered interferential coating has, in the activated state:
a mean light reflection factor in the visible region Rv on the front main face that is higher than or equal to 5.0%, and
a mean light reflection factor in the visible region Rv on the rear main face that is lower than 2.5%,
the mean light reflection factor being measured at an angle of incidence lower than 35°.

21. The ophthalmic lens according to claim 1, wherein the total thickness of the interferential coating includes the electrochromic stack is equal to or below 1 μm.

22. The ophthalmic lens according to claim 2, wherein each of the at least five ceramic layers of the electrochromic stack is an oxide.

* * * * *